United States Patent [19]

Kogure et al.

[11] Patent Number: 4,813,372
[45] Date of Patent: Mar. 21, 1989

[54] TONER IMAGE FIXING APPARATUS

[75] Inventors: Mitutosi Kogure; Yuka Nakamura, both of Kanagawa; Makoto Tamura, Tokyo, all of Japan

[73] Assignee: Kabushiki Kaisha Toshiba, Kawasaki, Japan

[21] Appl. No.: 46,696

[22] Filed: May 7, 1987

[30] Foreign Application Priority Data

May 8, 1986 [JP] Japan ................................ 61-103809
Jun. 28, 1986 [JP] Japan ................................ 61-152194
Jun. 30, 1986 [JP] Japan ................................ 61-153427

[51] Int. Cl.$^4$ ............................................. G03G 15/20
[52] U.S. Cl. ...................................... 118/60; 118/101; 219/216; 219/469; 355/3 FU; 355/14 FU; 432/60
[58] Field of Search ............... 118/60, 101; 432/60, 432/228; 219/216, 469, 471, 470; 355/3 FU, 14 FU

[56] References Cited

U.S. PATENT DOCUMENTS

| | | | |
|---|---|---|---|
| 3,437,032 | 4/1969 | Manghirmalani et al. | 432/228 X |
| 4,050,886 | 9/1977 | Moser | 29/132 X |
| 4,109,135 | 8/1978 | Minden et al. | 432/228 X |
| 4,266,115 | 5/1981 | Dannatt | 219/216 |
| 4,297,562 | 10/1981 | Kamogawa et al. | 219/216 |
| 4,301,359 | 11/1981 | Ito et al. | 219/469 |
| 4,395,109 | 7/1983 | Nakajima et al. | 432/60 X |
| 4,628,183 | 12/1986 | Satomura | 432/60 X |
| 4,724,305 | 2/1988 | Iimura et al. | 219/216 X |

FOREIGN PATENT DOCUMENTS

| | | | |
|---|---|---|---|
| 0039645 | 3/1979 | Japan | 118/60 |
| 0162772 | 12/1981 | Japan | 118/60 |
| 0151178 | 8/1984 | Japan | 355/3 FU |
| 0123879 | 7/1985 | Japan | 355/3 FU |
| 0163070 | 8/1985 | Japan | 355/3 FU |

OTHER PUBLICATIONS

Albert G. Guy, "Elements of Physical Metallurgy", 1959, pp. 256–257.

Primary Examiner—Shrive Beck
Assistant Examiner—Alain Bashore
Attorney, Agent, or Firm—Cushman, Darby & Cushman

[57] ABSTRACT

A thermal roller for fixing a powdered toner image onto an image receiving sheet is provided with a sub-surface resistive heat generating layer adjacent the outer surface of the roller. The thickness of the heat generating layer or the materials that constitute the layer are controlled so that the resistance per unit length of the thermal roller increases gradually in the axial direction from the center portion thereof toward and to both ends. Electrical energy passed through the heat generating layer generates a desired temperature distribution profile along the roller to provide appropriate fixing temperatures, without excessively increasing the temperature at both ends of the roller.

21 Claims, 5 Drawing Sheets

TONER IMAGE FIXING APPARATUS

BACKGROUND OF THE INVENTION

1. Field of the Invention

The present invention relates generally to a toner image fixing apparatus for thermally fixing a powdered toner image formed on an image recording material and, more particularly, to fixing rollers, that is, a thermal roller and a cooperating pressure roller, for fixing a powdered toner image onto an image recording sheet a in electrophotographic equipment, photocopying machines, image forming equipment, and the like.

2. Description of the Prior Art

In general, electronic photocopying machines form a duplicate of an original image by first reflecting light from the original onto a sensitized, electrostatically charged drum to form an electrostatic latent image. Powdered toner is attached onto the electrostatic latent image on the charged drum to visualize the latent image, and the toner image is transferred onto a toner-receiving sheet. The image is then thermally fixed by a fixing apparatus.

In the fixing apparatus of conventional copying machines, a toner-receiving sheet to which the toner image is transferred is fed through a nip defined between a heated roller and a cooperating pressure roller so that the toner image is permanently fixed onto the copy sheet as a function of the heat provided by the heated roller and the compression force provided by the pressure roller. In conventional toner image fixing apparatus, a hollow thermal roller is typically heated by a lamp (e.g., a halogen lamp) co-axially located within thermal roller with the radiation from the lamp heating the interior of the roller and the heat energy transferred to the exterior of the roller by conduction. This method of heating the thermal roller presents a number of disadvantages that result in a less than optimum thermal efficiency. More specifically, the preheating time is undesirably long because of the need to raise the temperature of the entire thermal roller by radiant energy, and it is difficult to quickly control the surface temperature of the thermal roller because of the thermal conduction time delays. If the surface temperature of the roller is not set to an appropriate value, the thermal roller is excessively heated at the opposite ends and can cause thermal deterioration in adjoining or adjacent elements, or, if the thermal roller is not heated to a sufficiently high temperature, the toner image will not be fixed on the toner receiving sheet in a permanent and stable manner.

As an alternative to a lamp-heated thermal roller, a resistive heat-generating layer can be used to provided the heat energy necessary to perform the fixing operation. The heat-generating layer is formed integrally with the thermal roller and generates heat in response to the conduction of electricity therethrough. While a heat-generating layer allows comparatively rapid control of the surface temperature of the thermal roller, an uneven temperature distribution along the length of the roller can occur when many sheets of copying paper of different widths are fixed continuously between the thermal roller and the pressure roller. The uneven temperature distribution typically results in a markedly lowered temperature at the opposite ends of the thermal roller making it impossible to achieve a uniformly acceptable fixing temperature alon the entire length of the thermal roller.

SUMMARY OF THE INVENTION

With these drawbacks in mind, therefore, it is the primary object of the present invention, among others, to provide a toner image fixing apparatus in which thermal efficiency is high and power consumption is commensurately low.

It is another object of the present invention to provide a toner image fixing apparatus in which the preheating time is short and in which the surface temperature of the thermal roller can be controlled to quickly achieve a desired target temperature.

It is another object of the present invention to provide a toner image fixing apparatus by which the thermal roller can be brought to a desired temperature in a comparatively short time and without excessively heating the thermal roller, in particular, without overheating the opposite ends thereof, to thus permit the safe, stable, and efficient fixing of the powdered toner image on an image receiving sheet.

In accordance with these objects, and others, a toner fixing apparatus in accordance with the present invention, for fixing a toner image onto an image-receiving material, is characterized by a resistive heat generating layer formed integrally with the thermal roller on or adjacent the operative outer surface thereof. The resistive heat generating layer is formed with a non-uniform electrical resistance distribution per unit length to provide a corresponding non-uniform temperature distribution along the length of the thermal roller. The resistance per unit length of the thermal roller increases gradually from the center of the thermal roller toward and to both ends thereof in the axial direction. A difference in resistance per unit length of 20% between the center and the ends of the thermal roller is preferred.

The resistance distribution of the resistive heat generating layer is adjusted, for example, by changing the thickness of the heat generating layer or the material components that constitute the resistive heat generating layer. Where the thickness of the heat generating layer is varied to provide the desired resistance and temperature variation, a difference in thickness of about 20% between the center and the ends of the thermal roller is sufficient to provide the desired temperature distribution profile.

The present invention allows preferred temperatures for the central portion and the opposite ends of the thermal roller to be achieved during the preheat cycle and the ready stage. During preheat, the center portion of the thermal roller is heated to a temperature of approximately 250° C. and the opposite ends thereof are heated to a temperature of about 230° C. to provide an intended 20° C. temperature difference between the center portion of the thermal roller and its ends. When the ready state is achieved, the central portion of the thermal roller is controlled to a temperature of 200° C. at the central portion thereof and about 190° C. at the opposite ends thereof to provide a 10° C. temperature difference therebetween.

Since the thermal roller is directly heated by the sub-surface resistive heat generating layer buried in the thermal roller without an intervening gap between the roller surface and the heat generating means, it is possible to directly and quickly control the surface temperature of the thermal roller to a desired temperature, thus improving the heat efficiency, power consumption, preheating time, fixing operation stability, etc. Further, the resistive heat generating layer is preferably formed with a roughened surface on both sides thereof to increase a heat generating surface area. A suitably roughened surface can be obtained, for example, by forming the heat generating layer with a sequence of recurring steps and grooves.

Further, since the surface temperature of the thermal roller is quickly regulated to a desirable target value in a short time because of direct heat conduction from the heating unit to the thermal roller surface and the adjusted resistance distribution of the heat generating layer, it is possible to prevent the thermal roller from being heated excessively at both ends thereof even if many sheets of paper having the minimum size are fixed on a continuous basis. Additionally, even if sheets of paper having the maximum size are fixed on a continuous basis, it possible to prevent the temperature of the ends of the thermal roller from being lowered, due to the very short heat conduction delay from the heat source.

BRIEF DESCRIPTION OF THE DRAWING

The features and advantages of the toner image fixing apparatus according to the present invention over the prior art apparatus will be more clearly appreciated from the following the invention taken in conjunction with the accompanying drawings in which like reference numerals designate the same or similar elements or sections throughout the figures thereof and in which.

DETAILED DESCRIPTION OF THE PREFERRED EMBODIMENT

Figure 1:
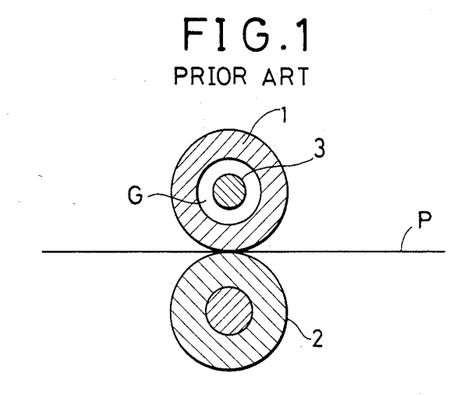
FIG. 1 is a diagrammatical cross-sectional view of prior art fixing rollers including a thermal roller and a pressure roller.
Figure 2:
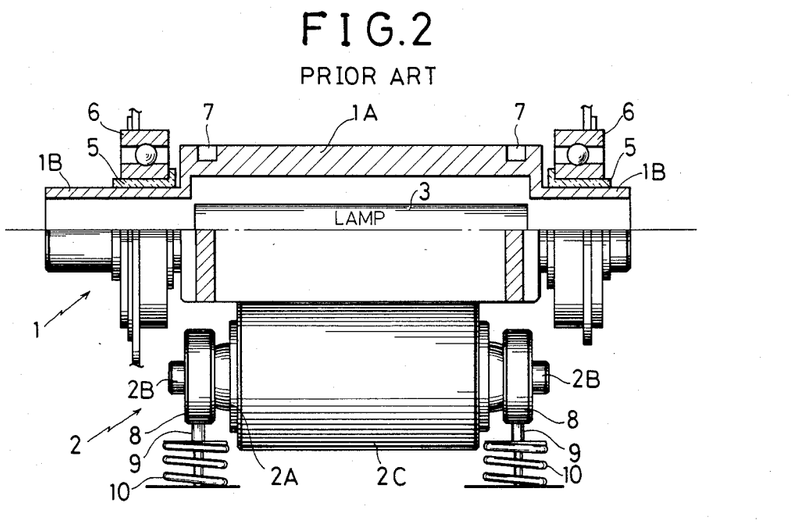
FIG. 2 is a front elevational view, partly in cross section, showing the fixing rollers illustrated in FIG. 1.

The structure and operating characteristics of a prior art toner fixing apparatus is illustrated in FIGS. 1-4, and, as shown in FIGS. 1 and 2, includes a thermal roller 1 heated to a predetermined operating temperature, a pressure roller 2 arranged in parallel with the thermal roller 1 to define a nip at the line of engagement between the two rollers and through which the toner carrying sheet is passed to thermally fix the powdered toner image onto the sheet. The pressure roller 2 is forced against the thermal roller 1 with a predetermined force by a pressure mechanism (FIG. 2) so that a toner carrying sheet P, as it passes through the nip defined by the rollers, is subjected to a predetermined compressive force or pressure. A drive unit (not shown) is provided for driving the two rollers 1 and 2 in synchronism with each other. The thermal roller 1 is provided with a heating unit 3, such as a heater lamp. Additionally, the thermal roller 1 is coated with a resin (not shown) on its surface, and, in a similar manner, the pressure roller 2 is coated by a heat resistant rubber or elastomeric material on its surface.

A copying sheet on which a toner image is recorded is passed between the thermal roller 1 and the pressure roller 2 by a sheet advancing and copying mechanism (not shown), so that the toner image can be fixed on the copying sheet as a function of the heat and pressure applied by the rollers 1 and 2.

As shown in FIG. 2, the thermal roller 1 is formed with a roller body 1A having an external surface of revolution and two metal shafts 1B (iron or aluminium) formed integrally with the roller body 1A and extending from the opposite ends thereof. A power supply ring 7, which is part of a power transferring slip-ring assembly, is provided adjacent each end of the roller body 1A to supply power to the heating unit 3. The metal shafts 1B are rotatably supported by two heat-resistant bearings 6 via respective heat insulating bushings 5.

The pressure roller 2 is formed with a roller body 2A having an external surface of revolution with two metal shafts 2B extending from opposite sides of the roller body 2A. A heat resistant elastic layer 2C, such as silicon rubber, is formed on the roller body 2A. The metal shafts 2B are rotatably supported by two bearings 8 at both ends of the roller body 2A, respectively. Each of the bearings 8 is secured to an arm 9 and resiliently urged by a compression spring 10, or functionally equivalent device, so that the pressure roller 2 is forced into engagement with the thermal roller 1 to subject a toner carrying sheet P passing through the nip between the two roller to a compressive force which, with the thermal energy applied from the thermal roller 1, is sufficient to fix the toner in a permanent and stable manner.

As shown in FIG. 1, a halogen lamp 3, for example, functions as the heat source and is disposed within the heat conducting cylindrical roller 1. In normal operation and after the thermal roller 1 is heated to about 200° C., an image recording sheet P having a powdered toner image thereon is passed through the nip defined between the thermal roller 1 and the pressure roller 2 to fix the toner image on the sheet by directly transmitting heat from the surface of the thermal roller 1 to the sheet P.

In the above-mentioned prior-art fixing apparatus, the thermal roller 1 directly contacts the sheet P to advantageously provide a high degree of thermal conductivity between the surface of the thermal roller 1 and the sheet P, in contrast to other thermal fixing systems, for example, the flash fixing system. Using the halogen lamp 3 as the heat source, it is possible to set the toner image fixing temperature to a relatively low range between 160° and 200° C. with the commensurate time required for fixing being as short as 0.020 to 0.025 seconds; as a result, it is possible to conserve the power consumed by the halogen lamp.

The above-mentioned prior-art thermal roller 1 has a number of associated drawbacks. As shown in FIGS. 1 and 2, a gap G exists between the halogen lamp heating unit 3 and the irradiated internal surface of the thermal roller 1. The gap G substantially reduces the thermal efficiency with the result that the preheating time, from the time the halogen lamp is initially illuminated to the time when the roller surface reaches a desired fixing temperature, is as long as 40 to 50 seconds, thus impeding the high speed operation of the copying machine.

Figure 3:
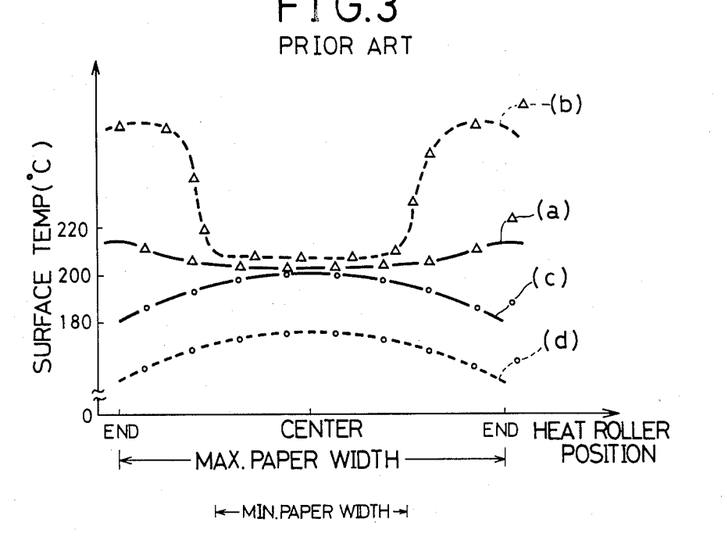
FIG. 3 is a graphical representation of temperature distribution relative to axial position on a prior-art thermal roller surface.

As shown in FIG. 3, it is very difficult to obtain a stable temperature distribution on the outer surface of the thermal roller 1 due to the presence of the gap G. In a first situation, the end portions of the thermal roller 1 can be operated at a somewhat higher temperature than the central portion, and, in a second situation, the end portions can be operated at a somewhat lower temperature than the central portion.

When both ends of the thermal roller 1 are operated at a temperature higher than the temperature of the center thereof in the ready state, as shown by distribution curve (a) in FIG. 3, and, thereafter, many sheets having the minimum width are fixed on a continuous basis, the thermal roller 1 temperature rises at both ends thereof as shown by distribution curve (b) in FIG. 3. The increase in temperature at the outer ends of the thermal roller 1, when many minimum sized sheets are passed between the rollers, can result in excessive heating of the surface of the thermal roller 1 as well as excessive heating of the heat insulating bearings and related components at the opposite ends of the thermal roller 1. The excess heat energy can result in thermal deformation or deterioration of the affected surface portions of the thermal roller 1, the support bushings 5, the support bearings 6, and related components including gears.

Conversely, when both ends of the thermal roller 1 are operated at a lower temperature than the temperature at the center thereof in the ready state, as shown by distribution curve (c) in FIG. 3, and when a single sheet having the maximum width (e.g., the A3 size) is fixed, the temperature is lowered at both ends of the thermal roller 1, as shown by distribution curve (d) in FIG. 3, particularly when the heat conduction from the heating unit 3 is delayed due to the intermittent on/off operation of the lamp. As a consequence, the roller temperature decreases below a lower limit and the quality and reliability of the fixing operation deteriorates.

In contrast to the use of the radiant energy heat source described above, a thermal roller 1 can be heated by a resistive heat-generating layer (not shown). While heat energy is quickly conducted from the heat-generating layer to the thermal roller surface, the surface temperature of the thermal roller 1 drops markedly at both ends thereof due to thermal scattering, and it is impossible to generate an appropriate temperature profile throughout the thermal roller 1, especially when many sheets of the maximum or minimum width are fixed on a continuous basis, without excessively increasing the temperature at both ends of the thermal roller 1.

Figure 4:
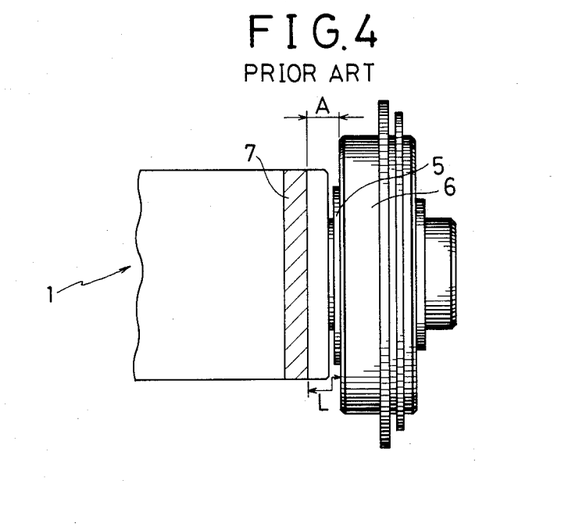
FIG. 4 is an enlarged side view showing one end of the prior art thermal roller.

On the other hand, in the prior art fixing apparatus, since a power supply ring 7 is disposed on each end of the thermal roller 1, as shown in FIG. 4, it is necessary to maintain a predetermined spacial insulation distance "A" between the end surface of the power supply ring 7 and that of the heat resistant bearing 6 or a predetermined creeping distance "L" between the power supply ring 7 and the adjacent bearing 6.

In the prior art fixing apparatus, however, since the whole end surface of the thermal roller 1 is directly in contact with that of the heat insulating bushing 5 fitted to the bearing 6, the heat insulating bushing 5 readily wears away with time, and therefore the insulation distance "A" and the creeping distance "L" are shortened, thus presenting a hazardous condition that can result in a short circuit path to ground.

A basic embodiment of the present invention is shown in FIGS. 5 to 8, and, as shown therein, a thermal roller 1, having an outer diameter of about 35 mm, includes a support cylinder 1A (FIG. 6) fabricated from a suitable material, such as iron, and having a reduced diameter surface 20 upon which various layers are formed. A first alloy layer 20a is formed on the surface 20, for example, from $Al_2O_3$, MgO,, and Ni functions as a thermal coefficient matching layer to prevent a crack or other undue stresses from being produced due to a difference in the thermal coefficient of expansion between the iron base material of the support cylinder 1A and a below described ceramic layer formed on the iron base material as a resistive heat generating layer. A first insulating layer 21 ($Al_2O_3$), having a thickness of about 1 mm, is formed by plasma injection on the alloy layer 20a. A resistive heat-generating layer 22 ($BaTiO_3$), also formed by plasma injection and having a thickness of about 100 to 150 $\mu$m at the center, is formed on the first insulating layer 21, and a second insulating layer 23, similar to the first insulating layer 21, is formed on the heat-generating layer 22. Lastly, a surface layer 24, such as a copolymer of PFA (polyfluorealkyl vinylether) is formed on the second insulating layer 23. The length of the heat generating layer 22 in the axial direction is roughly equal to the width of the largest copying sheet accommodated by the copying machine (e.g., the A3 size). The thickness of the heat generating layer 22 is so determined that the resistance per unit length is relatively high at the center thereof and increases gradually from the center towards the opposite ends thereof, as described in more detail below.

Figure 6:
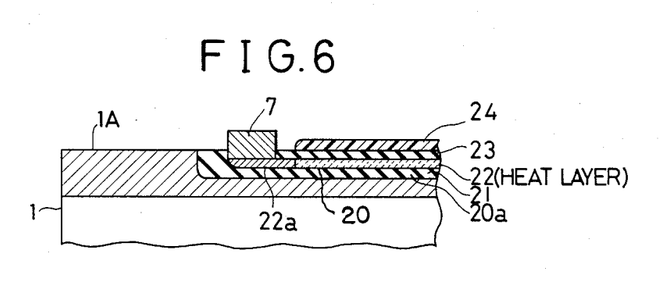
FIG. 6 is an enlarged view, in partial cross-section, of a resistive heat-generating layer buried in the outer surface of a thermal roller in accordance with the present invention.

As shown in the detail of FIG. 6, each of the two power supply rings 7 is mounted on a conductive material layer 22a disposed under the power supply ring 7 and in electrical contact with the resistive heat-generating layer 22. Brush assemblies 26, each including a brush holder and brush, are mounted adjacent each power supply ring 7 with the resective brush in sliding contact with its associated power supply ring 7. As can be appreciated, an electrical circuit exists between the brushes, power supply rings 7, the underlying conductive layers 22a, and the resistive, heat-generating layer 22. Alternating current power (e.g., 100V, 800W) is supplied to the heat generating layer 22 through the brushes 26, the power supply rings 7, and the conductive material layers 22a.

Figure 5:
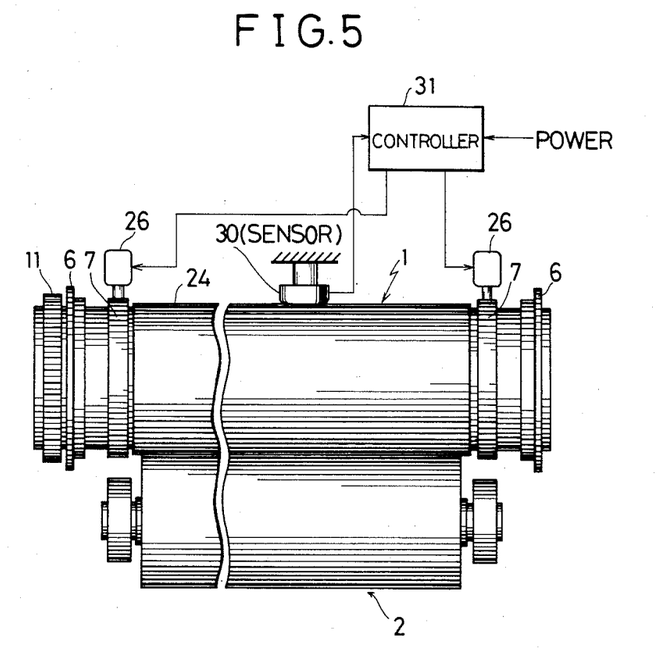
FIG. 5 is a front elevational view illustrating a toner image fixing apparatus according to the present invention.

As shown in FIG. 5, a temperature controller 31 is connected to each brush assembly 26 for controlling the electrical power applied through the above-described circuit to control the surface temperature of the thermal roller 1 in response to a signal provided by a temperature sensor 30. The controller 31 functions through a pre-heat cycle to heat the thermal roller 1 to predetermined a surface preheat temperature (e.g., 250° C.) and a predetemined ready temperature (e.g., 200° C.). The surface temperature of the thermal roller 1 is first increased to the preheat temperature and then lowered to the ready temperature by intermittently supplying electrical power to the heat generating layer 22 in response to the signal output of the temperature sensor 30.

Figure 7:
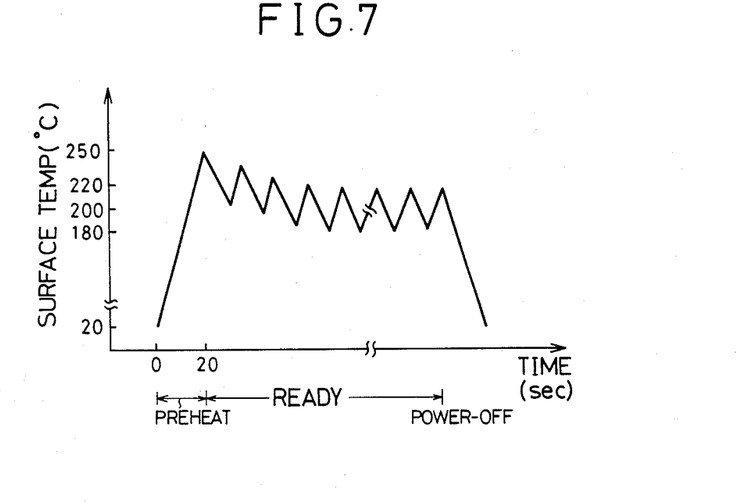
FIG. 7 is a graphical representation of the surface temperature variation in a thermal roller according to the present invention, which is detectable by a temperature sensor.

In the above-mentioned fixing apparatus, when the copying machine is powered to an ON state by operation of an ON/OFF switch (not shown), the thermal roller 1 is preheated by supplying electrical power to the resistive heat-generating layer 22 through the brush assemblies 26 and the power supply rings 7. As shown in FIG. 7, the surface temperature of the thermal roller 1 increases to a target preheat temperature of about 250° C. from the ambient room temperature (about 20° C.) in about 20 seconds. When the temperature sensor 30 detects the predetermined preheat value (viz., 250° C.) on the surface of the thermal roller 1, the controller 31 interrupts the supply of electrical energy to the resistive heat generating layer 22 and concurrently indicates a "READY" state on a control panel (not shown) of the copying machine, for example, by illuminating an appropriate indicator lamp.

Figure 8:
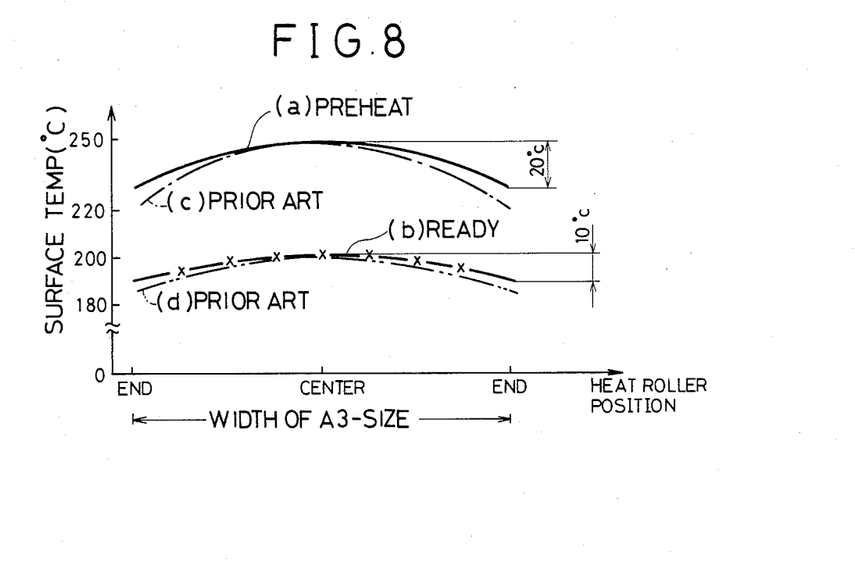
FIG. 8 is a graphical representation of the surface temperature distribution in the thermal roller according to the present invention.

During this preheating operation, the temperature on the surface of the thermal roller 1 is distributed as shown by distribution curve (a) in FIG. 8, in which the opposite ends of the thermal roller 1 are about 20° C. lower in temperature than the center thereof. Thereafter and until the power to the copying machine is turned OFF, the controller 31 functions to control the power supplied to the resistive heat generating layer 22 in response to signals sensed by the temperature sensor 30 in such a way that a ready state is maintained with the temperature of the thermal roller 1 within an appropriate fixing temperature range of about 180° to 220° C., as shown in FIG. 7. In this ready state and in the absence of an toner carrying sheet P being fixed, the temperature distribution on the surface of the thermal roller 1 is such that both ends of the thermal roller 1 are about 10° C. lower in temperature than the center thereof, as shown by distribution curve (b) in FIG. 8.

When many sheets of a small size paper (e.g., the A4 size) are to be fixed in a continuous manner and with the thermal roller 1 heated to its ready state, the surface temperature will rise at both ends of the thermal roller 1 because no heat is conducted to the relatively small copying sheets passed through the nip defined between the two rollers. Since the surface temperature is initially set at both ends of the thermal roller 1 about 10° C. lower than at the center thereof as discussed above, the rise in temperature at both ends of the thermal roller 1 consequent to fixing small size sheets is not sufficiently high that elements disposed near the ends of the thermal roller 1 are thermally deteriorated in quality.

Conversely, when many sheets of the maximum width (i.e., the A3 size) are fixed, the temperature of the thermal roller 1 drops at the center thereof down to the minimum value of 180° C. in the ready state, and the surface temperature of the thermal roller 1 decreases at both ends. However, once the resistive heat generating layer 22 is heated in response to the temperature signal detected by the temperature sensor 30, the temperature of the thermal roller 1 surface is quickly increased to the temperature necessary for fixing before the succeeding fixing operation starts. This rapid response occurs because the distance between the resistive heat generating layer 22 and the surface of the thermal roller 1 is short and heat can be transmitted directly from the layer 22 to the thermal roller 1 surface without an intervening gap therebetween as in the case of the prior art discussed above in relationship to FIGS. 1-4. Additionally, the surface temperature of the thermal roller 1 is preset higher at both ends by increasing the resistance per unit length of the thermal roller 1.

The present invention advantageously reduces the preheating time to about ½ that of the conventional apparatus. In addition, power consumption can be reduced by about 10 to 20% as compared with that of conventional apparatus, because no heat loss is produced in the intervening gap associated with prior art devices and the length of the resistive heat generating layer 22 can be reduced to such an extent as to roughly be equal to the width of the maximum size sheet to be fixed. Further, even when the thermal roller 1 is heated quickly over the predetermined fixing temperature in order to reduce the preheat time, since the temperature of the thermal roller 1 is set at both ends thereof about 20° C. lower than that at the center thereof, the heat resistant bearings 6 and associated gearing 11 (FIG. 5) will not be deformed or subject to deterioration due to over temperature operation.

When the thickness of the resistive heat generating layer 22 is uniform along the length of the thermal roller 1, the temperature drops markedly at both ends thereof as shown by distribution curves (c) or (d) in FIG. 8, and it is difficult to obtain the desired temperature difference (10° or 20° C.) shown in FIG. 8 between the center and the ends thereof. The present invention advantageously provides the resistive heat generating layer 22 as a layer or sub-surface substrate buried in the surface of the thermal roller 1 and, further, varies the resistance of the layer 22 so that the appropriate temperature distribution curve (a) or (b) can be obtained. More specifically, to obtain the desired temperature distribution on the thermal roller 1 surface, the resistance per unit length of the heat generating layer 22 is gradually increased toward both ends of the roller in such a way that the resistance per unit length is increased by about 20% or less of the center unit resistance. To change the layer unit resistance, the thickness of the heat generating layer 22 is gradually reduced toward the ends of the thermal roller 1 in such a way that the end thickness is reduced by about 20% or less of the center thickness. In addition to changing the thickness of the heat generating layer 22, it is also possible to increase the resistance from the center of the roller to the ends thereof by changing the material components that constitute the resistive heat generating layer 22.

In summary, the features of the fixing apparatus of the present invention are as follow:

(1) Since the heat generating layer is formed integrally with the thermal roller near the thermal roller surface, the heat conductivity is high; heat response time is low; heat controllability is high; the preheat time is short; and the power consumption is commensurately small.

(2) Since the temperature distribution of the roller surface in the preheat state is as shown by the distribution curve (a) in FIG. 8 (250° C. at the center and a 20° C. difference at the opposite ends), it is possible to quickly preheat the thermal roller 1 without excessively increasing the temperature at both ends of the thermal roller 1.

(3) Since the temperature distribution of the roller surface in the ready state is as shown by the distribution curve (b) in FIG. 8 (200° C. at the center and a 10° C. difference at the opposite ends), even if many sheets of the minimum size are fixed on a continuous basis, it is possible to reduce the temperature (by 10° C. or more) at both ends of the thermal roller. Further, even if many sheets of paper of the maximum size are fixed continuously, the thermal roller 1 can be heated quickly to above an appropriate fixing temperature (e.g. 180° C.). Further, without being limited to the above embodiment, the apparatus of the present invention can be modified in various ways. For instance, the materials and the dimensions of the heat generating layer 22 of the thermal roller can be modified. When the insulating layer 23 or the surface layer 24 formed on the resistive heat generating layer 22 is reduced in thickness, it is possible to reduce the heat conduction time from the heat generating layer 22 to the thermal roller surface and also the preheating time; that is, it is possible to reduce the delay in thermal conduction due to on-or-off operation of the power supplied to the heat generating layer 22 in the fixing temperature control operation during the ready state.

Although, the surface temperature of the thermal roller can be selected freely, it is preferable to determine the fixing temperature range from 170° to 220° C. in order to obtain a stable fixing operation and to prevent the peripheral elements from being heated excessively. Further, it is preferable that the temperature distribution on the thermal roller surface change in such a way as to decrease from the center of the thermal roller surface to the ends thereof within a range from 0° to 20° C. in preheat in state and within a range from 0° to 10° C. in ready state. In order to obtain the above-mentioned temperature distribution, the materials from which the heat generating layer constituted is modified in a gradual manner extending from the center to both ends thereof or the thickness of the layer is reduced from the center to both end thereof.

Figure 9:
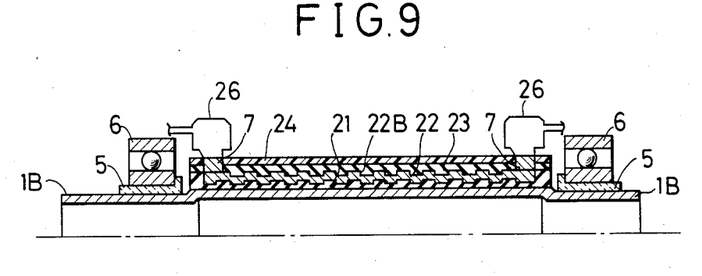
FIG. 9 is a partial cross-sectional view showing a modification of the resistive heat generating layer buried in the thermal roller according to the present invention.

FIG. 9 shows a modification of the thermal roller 1 of the fixing apparatus in which the resistive heat generating layer 22 is formed with a sequence of uneven steps to increase the heat generating surface area and thus increase the heat conductivity. As shown in FIG. 9, the outwardly facing surface of the heat conducting layer is formed with a series of alternating steps and grooves with the internally facing surface also formed with a series of alternating steps and grooves that are misphased, that is, out of step, with the outwardly facing surface. To form an irregular surface on the layer 22, it is preferable to use a mask in the plasma injection process to provide a local surface thickness variation of about 40 to 50 μm for a layer 22 of 100 to 150 μm thickness. As can be appreciated, other surface area enhancing or roughening configurations are possible to increase the heat generating surface area and to increase the heat transfer from the heat generating layer 22.

In the modification of FIG. 9, the outermost surface layer 24 is formed of a fluorine resin such as teflon(TM)(polytetrafluoroethylene) mixed with an electrically conductive material order to effectively prevent the toner carrying copy sheet from adhering to the outer surface of the thermal roller 1. The heat generating layer 22 of the modification of FIG. 9 can be formed of a nickel-chromium (nichrome) alloy or an alloy of iron, chromium, and aluminium.

Figure 10:
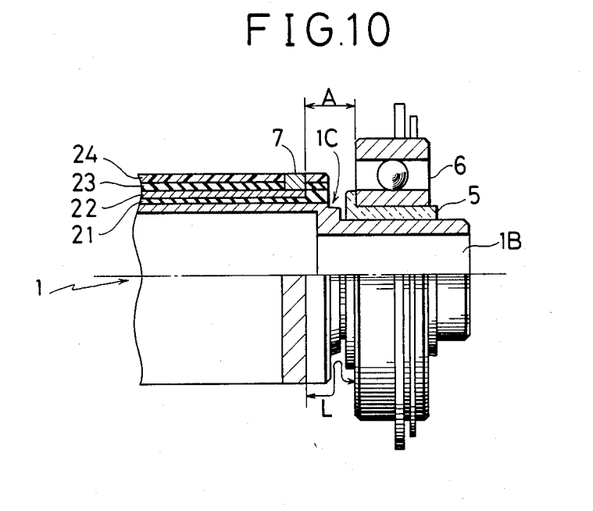
FIG. 10 is a half cross-sectional view and a half front view, in combination, showing an end of the thermal roller according to the present invention.

FIG. 10 shows a modification of the thermal roller 1 which is provided with a stepped projection portion 1C at both end positions at which the roller edge is in contact with the heat insulating bushing 5 fitted to the heat resistant bearing 6. The outer diameter of the stepped portions 1C of the thermal roller 1 is greater than the inner diameter of the heat insulating bushing 5. Therefore, it is possible to increase the spacial insulation distance A and the creeping distance L. In particular, even when the heat insulating bushing 5 wears away completely, since this stepped portion 1C is in contact with the bearing 6, it is possible to maintain a minimum insulating distance, thus improving the insulation characteristics of the thermal roller 1 relative to ground potential, in spite of the simple structure of the thermal roller 1.

Thus it will be appreciated from the above that as a result of the present invention, a highly effective toner image fixing apparatus is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A toner image fixing apparatus for fixing a toner image on an image fixing material of any given width passed between fixing rollers made up of a thermal roller and a pressure roller brought into pressure contact with the thermal roller, wherein said thermal roller comprises a resistive heat generating layer formed integrally with said thermal roller near and throughout an outer surface thereof, the resistance per unit length distribution in the axial direction of said resistive heat generating layer increasing gradually from a center of said thermal roller to both ends thereof to obtain a temperature distribution on a surface of said thermal roller such that the temperature gradually decreases from the center of said thermal roller to both ends thereof, and wherein said resistive heat generating layer is formed with a roughened surface on both sides thereof to increase the heat generating area thereof.

2. The toner image fixing apparatus as set forth in claim 1, wherein a difference in resistance per unit length between the center and the ends of said thermal roller is about 20% of a center unit resistance of said thermal roller.

3. The toner image fixing apparatus as set forth in claim 2, wherein the resistance distribution of said resistive heat generating layer is adjusted by changing the thickness of said resistive heat generating layer.

4. The toner image fixing apparatus as set forth in claim 2, wherein the resistance distribution of said resistive heat generating layer is adjusted by changing the material components that constitute said resistive heat generating layer.

5. The toner image fixing apparatus as set forth in claim 3, wherein a difference in thickness between the center and the ends of said thermal roller is about 20% of the center thickness of said thermal roller.

6. The toner image fixing apparatus as set forth in claim 5, wherein a difference in temperature between the center and the ends of said thermal roller is determined to be 20° C. or lower when said thermal roller is preheated.

7. The toner image fixing apparatus as set forth in claim 5, wherein a difference in temperature between the center and the end of said thermal roller is determined to be 10° C. or lower when said thermal roller is in a ready state.

8. The toner image fixing apparatus as set forth in claim 6, wherein temperature of said thermal roller is about 250° C. at the center thereof and about 230° C. at both ends thereof when said thermal roller is preheated.

9. The toner image fixing apparatus as set forth in claim 7, wherein temperature of said thermal roller is about 200° C. at the center thereof and about 190° C. at both ends thereof when said thermal roller is in a ready state.

10. The toner image fixing apparatus as set forth in claim 1, wherein said thermal roller is formed with a stepped portion at both ends thereof to increase a spacial insulation distance between the outermost end of said resistive heat generating layer and another element connected to electrical ground.

11. The toner image fixing apparatus as set forth in claim 1, wherein an axial length of said thermal roller is approximately equal to a maximum width of the image fixing material to be fixed.

12. A thermal toner-fixing roller for fixing a powdered toner image onto an image receiving material, comprising:
   a cylindrical body having a surface of revolution formed about an axis;
   an axially extending, electrically resistive layer on said surface having a non-uniform resistance value per unit axial length, said electrically resistive layer formed with a roughened surface on both sides thereof to increase the heat generating area thereof; and
   means at opposite axial ends of said resistive layer for connecting said resistive layer in an electrical circuit, whereby a current flow in said resistive layer between said axially opposite connecting means causes a temperature distribution on a surface of said body such that the temperature gradually decreases from the center of said body to both ends thereof.

13. The thermal toner-fixing roller of claim 12, wherein the temperature rise per unit axial length is a maximum intermediate the ends of the resistive layer.

14. The thermal toner-fixing roller of claim 13, wherein the temperature rise per unit axial length is a maximum intermediate the ends of the resistive layer and a minimum at the opposite ends thereof.

15. The thermal toner-fixing roller of claim 14, wherein said maximum value of the temperature rise per unit axial length is about 1.2 the minimum temperature rise value per unit axial length.

16. The thermal toner-fixing roller of claim 12, wherein the resistance value per unit axial length is a minimum intermediate the ends of the resistive layer.

17. The thermal toner-fixing roller of claim 16, wherein the resistance value per unit axial length is a minimum intermediate the ends of the resistive layer and a maximum at the opposite ends thereof.

18. The thermal toner-fixing roller of claim 17, wherein said maximum value of the resistance value per unit axial length is about 1.2 the minimum resistance value.

19. The thermal toner-fixing roller of claim 12, wherein the layer thickness per unit axial length is a maximum intermediate the ends of the resistive layer.

20. The thermal toner-fixing roller of claim 19, wherein the layer thickness per unit axial length is a maximum intermediate the ends of the resistive layer and a minimum at the opposite ends thereof.

21. The thermal toner-fixing roller of claim 20, wherein said maximum value of the layer thickness per unit axial length is about 1.2 the minimum layer thickness per unit axial length.

* * * * *